United States Patent [19]

Rabin

[11] Patent Number: 5,139,594
[45] Date of Patent: Aug. 18, 1992

[54] METHOD FOR JOINING CERAMIC SHAPES

[75] Inventor: Barry H. Rabin, Idaho Falls, Id.

[73] Assignee: The United States of America as represented by the United States Department of Energy, Washington, D.C.

[21] Appl. No.: 543,897

[22] Filed: Jun. 26, 1990

[51] Int. Cl.$^5$ ............................................. C04B 37/00
[52] U.S. Cl. ...................................... 156/89; 156/283; 156/325; 264/60
[58] Field of Search ......................... 156/89, 283, 325; 264/60, 62, 65

[56] References Cited

U.S. PATENT DOCUMENTS

| | | | |
|---|---|---|---|
| 2,319,323 | 5/1943 | Heyroth | 156/336 |
| 3,726,643 | 4/1973 | Merzhanov et al. | 423/489 |
| 4,321,100 | 3/1982 | Du Buske | 156/89 |
| 4,487,644 | 12/1984 | Gupta et al. | 156/89 |
| 4,762,269 | 8/1988 | Gyarmati et al. | 228/194 |
| 4,917,958 | 4/1990 | Akai et al. | 428/457 |

OTHER PUBLICATIONS

Rabin, "INEL-1(B)-Joining Of Silicon Carbide Composites", Input for DOE AR&TD Program Semiannual Report, Nov. 1989.
EG&G Report No. MISC-89-041, B. H. Rabin, "INEL-1(b)-Joining of Silicon Carbide-Reinforced Ceramics", Idaho National Engineering Lab.
Munir, "Synthesis of High Temperature Materials by Self-Propagating Combustion Methods".
Cawley. "Joining of Ceramic-Matrix Composites", Ceramic Bulletin, vol. 68, No. 8, 1989, pp. 1619-1623.

Primary Examiner—James Lowe
Assistant Examiner—Christopher A. Fiorilla
Attorney, Agent, or Firm—James W. Weinberger; Thomas G. Anderson; William R. Moser

[57] ABSTRACT

A method for joining shapes of ceramic materials together to form a unitary ceramic structure. In the method of the invention, a mixture of two or more chemical components which will react exothermically is placed between the surfaces to be joined, and the joined shapes heated to a temperature sufficient to initiate the exothermic reaction forming a joining material which acts to bond the shapes together. Reaction materials are chosen which will react exothermically at temperatures below the degradation temperature of the materials to be joined. The process is particularly suited for joining composite materials of the silicon carbide-silicon carbide fiber type.

10 Claims, No Drawings

METHOD FOR JOINING CERAMIC SHAPES

CONTRACTUAL ORIGIN OF THE INVENTION

The United States Government has rights in this invention pursuant to Contract No. DE-AC07-76ID01570 between the U.S. Department of Energy and EG&G Idaho, Inc.

BACKGROUND OF THE INVENTION

This invention relates to an improved method of joining two or more ceramic shapes to form a unitary ceramic structure. More specifically the invention relates to a method of joining two or more shapes of ceramic composite material to form a unitary structure. Still more specifically this invention relates to a method of joining or bonding two or more shapes of silicon carbide composite material to form a unitary structure without degrading the mechanical properties of the joined material while providing a joint capable of withstanding temper-atures up to about 1000° C.

There is considerable interest in the development of advanced ceramic fiber/ceramic matrix composites for high temperature applications. One such composite is a silicon carbide fiber-reinforced silicon carbide which is under development for structural applications at temperatures up to 1000° C. This composite may contain about 40 vol. % silicon fibers, and is infiltrated to about 85% of theoretical density with silicon carbide. For this material, reductions in strength have been shown to result from prolonged exposure to elevated temperatures. For example, strength losses have been observed above approximately 1000° C., while greater losses occurred above 1200° C. This reduction in properties has been attributed to degradation of the SiC fibers that occurs at these temperatures. However, strength losses can be minimized to temperatures approaching 1400° C. by coating the fibers with carbon and externally coating the composites with a protective layer of SiC. In order to fully realize the potential of these composites, reliable and practical joining techniques must be developed that will permit the use of these materials as complex shaped components or allow their integration into existing engineering designs. Such joints require strength and toughness comparable to the joined material under the temperature and environmental conditions of the projected application There exists a number of methods for joining two or more shapes of ceramic material such as silicon carbide. These techniques include direct diffusion bonding, codensification of interlayer and green bodies, diffusion welding or brazing with boride, carbide and silicide interlayers, hot pressing of sinterable SiC powder, bonding with polymer precursors, brazing with oxide, or oxynitride materials, reactive metal bonding, and active metal brazing However, none of these techniques, except active metal brazing are suitable for use with the composite ceramics such as the silicon carbide fiber-reinforced silicon carbide matrix composites (SiC/SiC) because they generally require temperatures above about 1650° C. Active metal brazing, while operable at temperatures low enough to join the composite shapes without harming the composite material, results in joints which are unable to withstand the temperatures at which the composite material is capable of operating, so that the joined structure cannot be used at its full temperature potential.

What is needed is a method for joining shapes of ceramic composite materials and most particularly shapes of silicon carbide composites, which is capable of joining the shapes at temperatures no higher than about 1450° C. while providing a joint which is capable of withstanding the thermal and mechanical conditions of which the composite material is capable.

SUMMARY OF THE INVENTION

A method has been developed which meets the requirements set forth hereinbefore. By the method of the invention for joining two or more ceramic shapes to form a unitary ceramic structure, a joining surface is provided on each shape to be joined, a layer of at least one component of a precursor joining mixture is applied to the surface, the joining mixture being a mixture of two or more chemical components which will, when heated to initiation temperature react exothermically to form a joining material, mating the surfaces to be joined together with the at least one chemical component between them, pressing the surfaces together and heating the shapes, in the presence of the remaining reaction mixture components, to initiation temperature whereby the components of the reaction mixture react exothermically to form a joining material between the joining surfaces which bonds the shapes together, thereby forming a unitary ceramic shape.

The method of the invention is suitable for joining shapes of any ceramic or metallo-ceramic materials and is most particularly suitable, because of the generally lower reaction temperatures involved, for joining shapes of composite ceramic materials such as silicon carbide/silicon carbide fiber without degrading the composite while providing a joint capable of withstanding the temperatures at which the composites were designed to operate.

It is therefore one object on the invention to provide an improved method of joining ceramic and metallo-ceramic shapes.

It is another object of the invention to provide an improved method for joining ceramic and metallo-ceramic shapes at temperatures lower than prior art methods.

Finally, it is the object of the invention to provide a method for joining shapes of composite ceramic materials such as silicon carbide containing silicon carbide fiber without affecting the strength of the composites while providing a joint between the shapes capable of withstanding the temperatures at which the materials remain stable.

DETAILED DESCRIPTION OF THE INVENTION

These and other objects of the invention for joining one or more ceramic shapes to form a monolithic ceramic shape may be met by providing a joining surface on each ceramic shape to be joined, applying about a 0.1 mm layer of a reaction mixture to each surface, the reaction mixture consisting of a stoichiometric mixture of titanium and carbon powder containing about 15 wt. % nickel powder, mating the joining surfaces together with the reaction mixture therebetween, applying a pressure of about 20 MPa to the surfaces and heating the bodies in a furnace under an argon atmosphere to about 1250° C. whereby the reaction mixture ignites exothermically to form a titanium carbide-nickel joining material which then reacts with the joining surfaces thereby bonding the shapes together forming a single monolithic shape.

The reaction mixture may be any mixture of two or more chemical components, which when heated to ignition temperature, will react exothermically to form a joining material suitable for joining the particular ceramic materials together. Preferably the ignition temperature of the mixture is below the temperature at which the ceramic or ceramic composite material begins to degrade. While this temperature may be several thousand degrees centigrade for pure ceramic materials, it is preferably no higher that about 1450° C. for the silicon carbide/silicon carbide fiber composite materials. Suitable mixtures include stoichiometric mixtures of titanium and boron, molybdenum and silicon, and titanium and carbon. The addition of about 5 to 25, preferable 10 to 15 wt. % nickel to the mixtures of TiC and TiB reduces the ignition temperature to about 1250° C. The presence of the nickel in the mixture also aids densification of the joining material by forming a liquid phase between the joining surfaces. The mixtures are prepared by mixing finely divided powders of the components together. While powder size is not critical, powders of −325 mesh were found to provide suitable results. The mixtures can be applied to the faces of the shapes to be joined as powders or by preparing a slurry from the powder by mixing about 90 to 120 parts by weight of a solvent such as 2-butanone with about 5 to 15 parts by weight of a binder such as poly(vinyl-chloride/vinylacetate) with about 2 parts by weight of menhaden fish oil as a deflocculent to 100 parts of the powder. This slurry can then be applied to the surfaces using any technique known to those skilled in the art, such as tape casting using a doctor blade. Such a process is described by J. C. Williams, "Doctor-Blade Process" in *Treatise on Materials Science and Technology*, Vol. 9, *Ceramic Fabrication Processes*, pp. 411–448, G. Y. Onoda and L. L. Hench (ed), Wiley, New York, 1978.

Preferably both of the surfaces to be joined are coated with the reaction mixture. The thickness of the mixture on the surface may vary from about 0.05 to 0.5 mm, preferably, if both surfaces are coated the thickness is about 0.1 mm, while if only one surface is to be coated, a thickness of about 0.2 mm is sufficient. After the surfaces to be joined are mated together, pressure is applied to the surfaces to ensure that the surfaces are properly joined together once the exothermic reaction has been initiated. This pressure may vary from about 5 to 50 MPa, preferably 15 to 25 MPa. The shapes are heated in a furnace under an inert atmosphere which may be argon or any other suitable inert gas.

Another suitable reaction mixture is a mixture of silicon carbide and carbon or carbon alone which will react with molten silicon to form a SiC+Si interlayer by reaction bonding. The carbon source may be in any of several physical forms. For example, it may be applied to the surface as powder, as carbon fibers or as woven carbon fiber cloth. The carbon or mixture of carbon powder and silicon carbide powder may be applied to the surfaces to be joined as either a powder or by utilizing the tape casting method described above. To utilize the carbon-silicon carbide reactants, the surfaces of the shapes to be joined are coated with the first component, i.e. the carbon or carbon-silicon-carbide mixture and the surfaces mated. A small amount of pressure is applied to the surfaces to ensure that surface contact is maintained. A supply of silicon metal in an amount at least sufficient to react with the carbon and/or carbon-silicon-carbide present on the mated surfaces is positioned near the joint, and the shapes and silicon heated in a furnace under a slight vacuum to a temperature sufficient to melt the silicon metal (about 1410° C.) The molten silicon infiltrates the joint by capillary action and reacts with the carbon and/or silicon carbide present in the joint to form silicon carbide.

The following examples are presented to assist in describing the invention, but are not to be taken as limiting the scope of the invention which is defined in the claims appended hereto.

EXAMPLE I

A well blended powder mixture having the composition of approximately 69 wt. % titanium (sponge, −400 mesh), 16 wt. % carbon (acetylene black, 0.02 μm), and 15 wt. % nickel (carbonyl, 15–20 @6,37 m) was applied as a thin layer onto both surfaces of the silicon carbide bodies to be joined. The powder coated joining surfaces were placed in contact by stacking the bodies one on top of the other in a solid graphite fixture with a hole cut slightly larger than the size of the bodies. The assembly was then loaded into a graphite resistance heated furnace in a hot pressing apparatus. The furnace was sealed and evacuated to a pressure of about 4 Pa using a mechanical roughing pump. An external pressure of between 20 and 50 MPa was applied to the bodies and maintained during the remainder of the procedure. The furnace was heated to 400° C. at about 20° C./Min, after which time the atmosphere was changed from a vacuum to flowing argon. The furnace heating was then continued at the same rate to a maximum temperature of 1400° C. At a temperature of approximately 1250° C. an exothermic reaction was initiated in the powder layer resulting in the rapid (∼2 s) in situ formation of a titanium carbide-nickel joining material that reacted with the bodies to be joined causing then to be bonded together. Upon cooling of the furnace, the joined bodies were removed from the graphite fixture.

EXAMPLE II

A well blended powder mixture having the composition of approximately 67 wt. % silicon carbide (−325 mesh) and 33 wt. % carbon (acetylene black, 0.02 μm was applied as a thin layer to both surfaces of the silicon carbide bodies to be joined. The powder coated surfaces to be joined were then placed in direct contact and held in place within a solid fixture (graphite, alumina, or boron nitride) by mechanical slip fitting with graphite spacers. A lump of pure silicon metal that was determined to be more than sufficient to fill the joint region was placed on top of the bodies to be joined in close proximity to the mated surfaces. The assembly was then loaded into a furnace and the furnace was evacuated to about 4 Pa using a mechanical roughing pump. The furnace was then heated at a rate of approximately 20° C./min up to a maximum temperature that exceeded the melting point of silicon (∼1410° C.), and held at this temperature for at least 15 min. During this time, the molten silicon is drawn into the powder layers within the joint by capillary action causing the in situ formation of silicon carbide through the exothermic reaction between the molten silicon and the carbon powder. Upon cooling of the furnace, the joint material consisted of the original silicon carbide powder, silicon carbide formed in situ, and excess free silicon that filled in most of the remaining porosity. The silicon carbide bodies were found to be well bonded together by the wetting and reaction behavior of the joining material.

EXAMPLE III

A piece of commercially available woven carbon cloth (approximately 0.28 mm thickness) was cut to a size slightly larger than the silicon carbide bodies to be joined. The cloth was sandwiched firmly between the bodies by placing all three within a suitable fixture that used graphite spacers to apply a small mechanical load to the bodies. A lump of pure silicon metal more than sufficient to fill the joint region was placed on top of the bodies in close proximity to the joining surfaces. The assembly was then loaded into a furnace and the furnace was evacuated to about 4 Pa using a mechanical roughing pump. The furnace was then heated at a rate of approximately 20° C./min up to a maximum temperature that exceeded the melting point of silicon and held at this temperature for approximately 30 min. During this time, the molten silicon infiltrated the carbon cloth by capillary action filling the entire joint region. The carbon cloth reacted in situ with the molten silicon to form silicon carbide. Upon cooling, the joint material consisted of aligned silicon carbide crystals formed in situ, along with excess silicon that filled most of the remaining porosity, and a few percent unreacted carbon. Upon removal from the joining fixture the bodies were found to be well bonded as a result of the wetting and reaction behavior of the joining material.

As can be seen for the preceding discussion and Examples, the method for the invention provides a new and effective method for joining together ceramic shapes and, in particular, shapes of silicon carbide composite materials at temperatures below those which would result in degradation of these materials.

The embodiment of the invention in which an exclusive property or privilege is claimed is defined as follows:

1. A method for joining two or more ceramic shapes to form a unitary ceramic structure comprising:
   providing a joining surface on each ceramic shape to be joined;
   applying a layer of precursor joining mixture to at least one joining surface, said joining mixture being a stoichiometric mixture which when heated to initiation temperature, will react exothermically to form a joining material, said joining mixture being selected from the group consisting of molybdenum and silicon, titanium and carbon, and titanium and boron;
   mating the joining surfaces to be jointed with the joining mixture therebetween;
   pressing the joining surfaces together; and
   heating the shapes to initiation temperature whereby the joining mixture reacts exothermically to form the joining material between the joining surfaces which joins the shapes thereby forming a unitary ceramic structure.

2. The method of claim 1 wherein the precursor joining mixture is selected from the group consisting of titanium and carbon and titanium and boron.

3. The method of claim 2 wherein the precursor joining mixture also contains from about 5 to about 25 weight percent nickel.

4. The method of claim 3 wherein the initiation temperature is below about 1300° C.

5. The method of claim 4 wherein the pressure on the joining surfaces is from about 20 to 50 MPa.

6. The method of claim 5 wherein each joining surface has a layer of joining mixture thereupon.

7. A method for joining two or more ceramic shapes of silicon carbide composite material containing silicon carbide fibers to form a unitary ceramic structure comprising:
   providing a joining surface on each ceramic shape to be joined;
   applying a layer of a precursor joining mixture to at least one joining surface, said joining mixture being a stoichiometric mixture which when heated to initiation temperature, will react exothermically to form a joining material, said joining mixture being selected from the group consisting of molybdenum and silicon, titanium and carbon, and titanium and boron;
   mating the joining surfaces to be joined with the joining mixture therebetween;
   pressing the joining surfaces together at a pressure of from about 5 to 50 MPa; and
   heating the shapes in an inert atmosphere to initiation temperature whereby the joining mixture reacts exothermically to form the joining material between the joining surfaces which bonds the shapes thereby forming a unitary ceramic structure of silicon carbide composite material containing silicon carbide fibers.

8. The method of claim 7 wherein the precursor joining mixture is selected from the group consisting of titanium and carbon and titanium and boron.

9. The method of claim 8 wherein the precursor joining mixture also contains from about 5 to about 25 weight percent nickel.

10. The method of claim 9 wherein the shapes are heated to about 1300° C.

* * * * *